Sept. 13, 1966    H. N. MOORE    3,272,684
EXPANSION JOINT
Filed Aug. 13, 1963    2 Sheets-Sheet 1
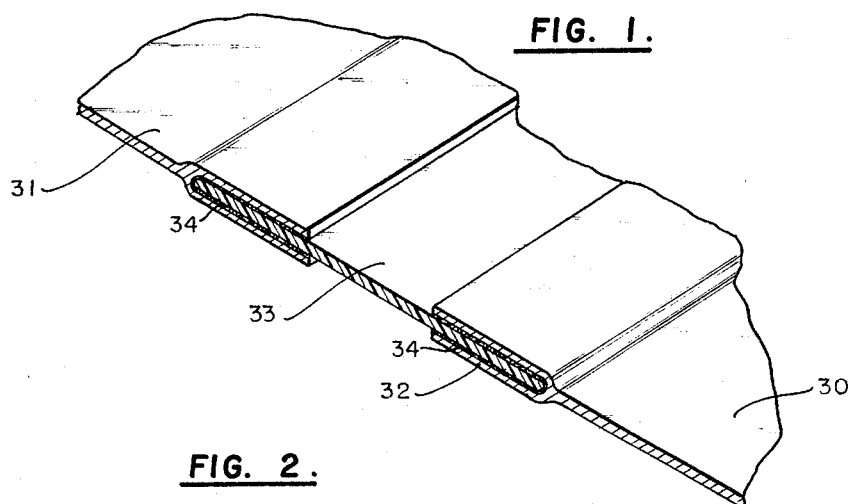
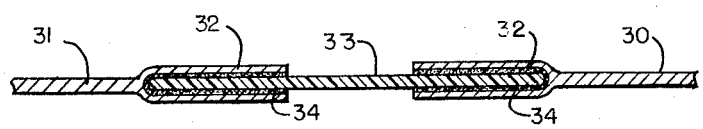
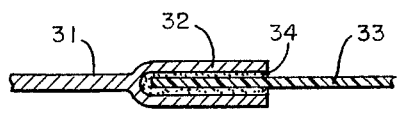
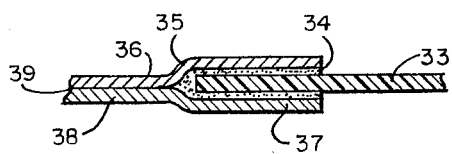
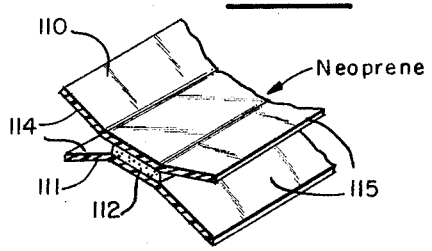
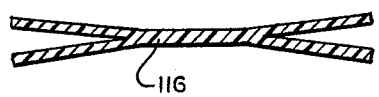
INVENTOR
Howard Nelson Moore
BY *Moore, Hall & Pollock*
ATTORNEYS Sept. 13, 1966     H. N. MOORE     3,272,684
EXPANSION JOINT
Filed Aug. 13, 1963                          2 Sheets-Sheet 2
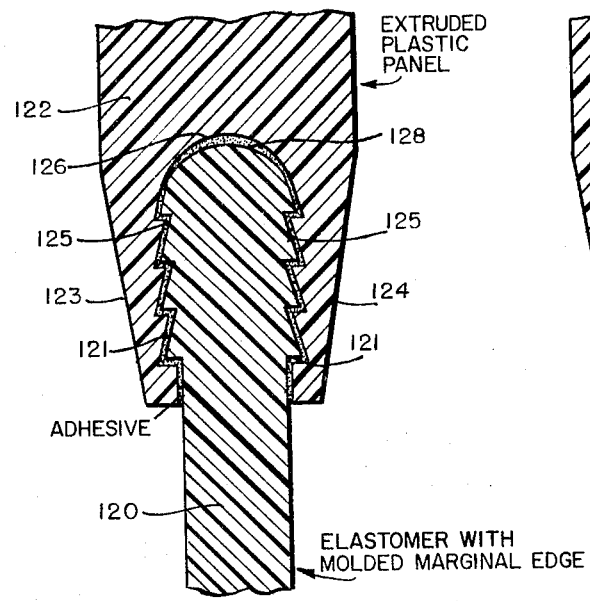
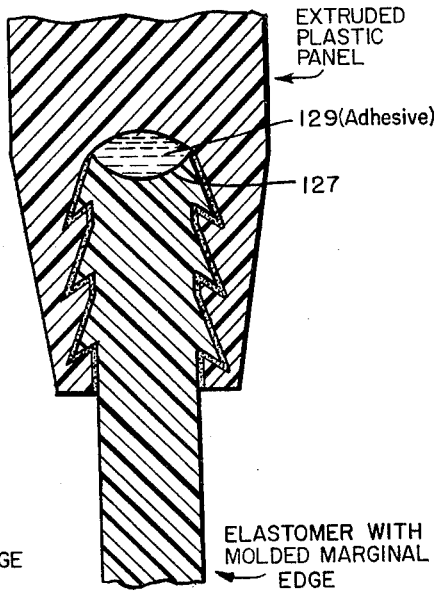
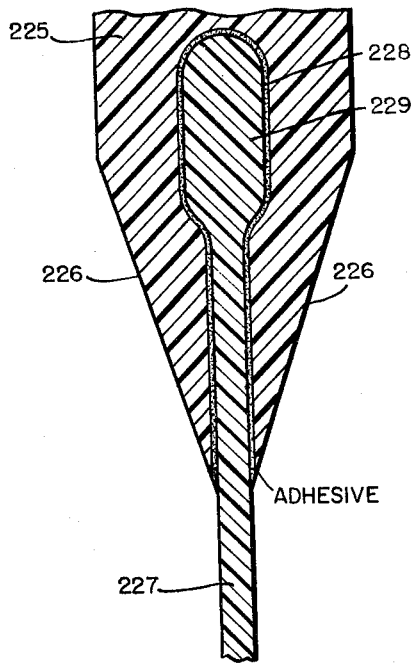
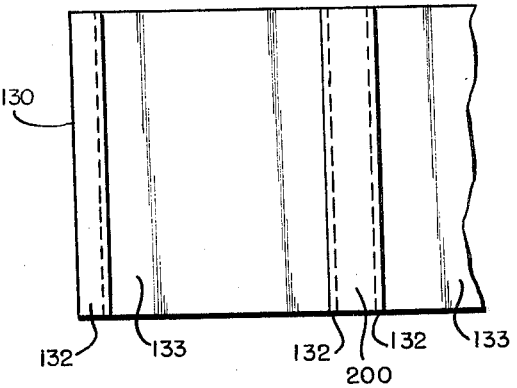
INVENTOR
Howard Nelson Moore United States Patent Office 3,272,684
Patented Sept. 13, 1966

3,272,684
EXPANSION JOINT
Howard Nelson Moore, Kensington, Md., George W. Moore, administrator of the estate of Howard N. Moore, deceased, assignor to Lamont & Riley, Inc., Worcester, Mass., a corporation of Massachusetts
Filed Aug. 13, 1963, Ser. No. 301,799
1 Claim. (Cl. 161—37)

The present invention concerns improvements in the techniques and means for making expansion joints per se and in roof and wall structures in which the parts are dimensioned to perform other functions. In expansion joints a narrow panel of elastomeric material joins two panel members which may be of metal or relatively inextensible plastic material. In roof or wall structures wide strips of elastomeric material may be joined by a relatively narrow panel of inextensible material which is preferably of plastic though satisfactory panels may be made from wood or metal. The invention is particularly concerned with the character of the joint between the elastomeric material and the relatively inextensible panel member. The panel members may be flexible so as to be readily bent into a desired position without being extensible to an objectionable degree.

It is an object of the invention to provide a joint between an elastomeric material and a relatively inextensible panel member such that it is as strong as the material and the member. Failure, if it occurs, is not any more likely to occur at the joint than any other place in the structure.

It is an object of the invention to provide a U-shaped joint structure with the bifurcation in a marginal edge of either the elastomer or the panel members and the corresponding marginal edge of the other one being cemented in place and substantially filling the bifurcation. While it is not necessary that the bifurcation be filled all the way to the bottom thereof by the marginal edge of the other element, the sides of the bifurcation and of the enclosed marginal edge should be in smooth firm contact and the contact area should be sufficiently large so that failure does not occur at the joint.

Reference is made to the Encyclopedia Britannica, vol. 19, pp. 606–608, published 1958, on synthetic rubbers which comprise copolymers of butadiene and styrene, neoprene, butyl, copolymers of butadiene and acrylonitrile, plasticized polyvinyl esters such as "Koroseal," "Vinylite" and "Geon," silicone and silastic rubbers, acrylates, together with other materials there listed under the heading Synthetic Rubber. Reference is also made to Elastomers and Plastomers, Their Chemistry, Physics, and Technology, 3 vol., R. Houwink, editor, published by Houston and London 1948; Synthetic Rubber, G. S. Whitby, editor, New York 1954. Synthetic rubber and elastomers are equivalent generic terms of art which have gained wide acceptance for materials having high extensibility, the latter term including the former.

It should be noted that although the extensibility of synthetic rubber is one reason it is in the joint structure, the application of a stretching load to the joint applies force to the bond between the panels and the synthetic rubber. If the lateral edge of the synthetic rubber within the bifurcation is permitted to yield, it tends to stretch and to apply highly localized load to the bond between the rubber strip and the relatively inextensible material of the panel, causing bond failure at the outer edge where extension is greatest. Initial failure here transfers the localized load farther in the bifurcation and progressive, incremental, step-by-step failure of the bond takes place. This is avoided or minimized by providing firm bonding fit of the edge of the synthetic rubber material between the opposed surfaces of the bifurcation and substantially filling this space so that the bonded faces lie in close bonding contact over their opposed areas. It will be seen that extensibility of the elastomer within the joint is greatly reduced if not substantially eliminated.

It is an object of the invention to provide an expansion joint, roofing or siding structure wherein both the elastomer and the relatively inextensible panels are composed of synthetic material of such character that the strength of the bond between the elements forming the joint is sufficiently great that failure, if it occurs, is no more likely to occur at the joint than in one or both of the elastomers or panels making up the structure.

It is an object of the invention to provide a joint comprising a resilient neoprene rubber strip capable of elongation of at least one hundred percent and having a tensile strength of at least one thousand pounds per square inch, joined to relatively inextensible panel members with an adhesive bond therebetween. The bond may be mechanical-adhesive in character, as where interlocking projections of the elements are employed, or bifurcations are pressed strongly into margin gripping position and are caused to set with the marginal edge of the other element gripped tightly within the bifurcation, the arms of which may be spread apart to receive the elastomer. Again, the entire joint structure may be thermo-set so that the joint structure becomes integral or unitary and that portion of the elastomer within the bifurcation or joint has greatly reduced extensibility or is as substantially inextensible as the panel member. In this way, step-by-step or incremental failure can be eliminated because the extensibility of the elastomer does not extend to that portion of the elastomer within or closely adjacent the bifurcation.

It is an object of the invention to provide a joint between an elastomer and a plastic panel with interlocking means comprising projections on the marginal edges of the elastomer and mating projections on the inside walls of a bifurcation in the panel members. The interlocking means are so shaped that the marginal edge may be readily inserted into a bifurcation.

It is an object of the invention to irradiate the plastic material forming a joint with electrons, gamma rays, neutrons or similar nuclear particles or ray energy to produce cross-linkage between long chain polymers comprising the plastic material making up the joint. Cross-linkage increases the tensile strength, yield strength, creep strength and resistance to elevated temperatures and weathering. By such treatment incremental step-by-step failure is controlled or eliminated. Cross linkage can take place not only within the plastic itself but between layers of plastic material, particularly where the adhesive used has a plastic base. Irradiation can be used to cause or to accelerate the setting or polymerization of the plastic base adhesive. When the adhesive contains single molecules or monomers, irradiation can produce polymerization and actually create the long chain polymers in situ. Continued irradiation will then cross link those polymers to each other and also to the polymers making up the laminations of the joint.

It is an object of the invention to irradiate a plastic joint heavily enough to harden the joint structure by cross-linkage of polymers sufficiently so that the joint itself is relatively inextensible and substantially all of the extension of the elastomeric material occurs outside the joint.

In the drawings:
FIGURE 1 is a fragmentary perspective view of a joint structure according to the invention;
FIGURE 2 is a section taken along line 2—2 of FIGURE 1;
FIGURE 3 is a fragmentary section of an enlarged detail of FIGURE 2;

FIGURE 4 is a modification of FIGURE 3;

FIGURE 5 is a perspective view of one form of joint-forming element according to the invention;

FIGURE 6 is a modified form of FIGURE 5;

FIGURE 7 is a fragmentary section of a different form of the invention;

FIGURE 8 is a fragmentary section of a modification of FIGURE 7;

FIGURE 9 shows a form of the invention which may be used as a roof or wall structure; and FIGURE 10 is a fragmentary section of still another modification.

In FIGURE 1, plastic panels 30 and 31 of relatively inextensible material are provided with bifurcations 32 along their facing marginal edges and elastomer 33 is placed between the panels with its marginal edges within the two bifurcations. Bifurcations 32 are pressed firmly together to provide a strong bond.

The bond may be obtained by the simultaneous application of heat and pressure, by pressure alone or by contact, depending upon the character of the materials employed. The preferred form of bond by use of an adhesive utilizing a neoprene-based system comprising a primer and vulcanizing cement, yielding a peel-pull value in excess of thirty-five pounds per inch per minute at right angles. The use of plastic panels can be made to provide a cohesive bond of highest strength as measured in peel-pull units. The adhesive material in the joint is indicated at 34.

FIGURE 4 shows a modified form of joint in which the U-shaped bifurcation is constructed by a two-piece composite plastic panel member composed of a pair of superposed plastic panels 36 and 38, joined to one another at 39 either cohesively as shown, or adhesively with the adhesive 34 extending between the parts 36 and 38. The bifurcation is formed by parts 35 and 37, to provide the desired U-shaped edge portion for receiving the marginal edge of the neoprene section 33. It will be understood that the material 34 may be basic composition similar to that of elastomer 33 and of the plastic panel members 31, 32, 35–38, differences in structure, chemical composition and physical properties being obtained by suitable additives as discussed under Plastics, Van Nostrand's Scientific Encyclopedia, third edition, 1958, pages 1268–1273, inclusive.

The joint structure of FIGURE 4 may be made by extruding or rolling flat stock which may be coated with adhesive 34 on the portion 37. Elastomer 33 can then be unrolled along the portion 37. The portion 38 and the marginal edge of elastomer 33 overlying portion 37 may then be coated with adhesive and the plastic panel strip 35, 36 fed or unrolled into place. A final rolling step with pressure rolls makes jointure at 39 and forms the U-shaped bifurcation shown in FIGURE 4. Heat may be applied as well, simultaneously with or subsequent to the roll-forming step, to make a stronger joint or to produce thermo-setting of the joint structure including the portion of the marginal edge of elastomer 33 within the U-shaped bifurcation. Thermosetting is discussed in the Van Nostrand article and functions in the joint to change the elasticity of the adhered marginal edge of elastomer 33, so that extension thereof ceases substantially at the edges of bifurcations 35, 37 and incremental step-by-step failure of the joint as discussed above, is prevented, because the conditions which are a prime cause are not permitted to exist.

The joint of FIGURE 4 may also be made by pre-forming panel laminations 35, 36 and 37, before assembly.

A further joint structure comprising at least four layers of material securely bonded together would require both of the sheets to be joined to have bifurcations, each of the bifurcations having one side between the two sides of the other bifurcation and in smooth bonding contact therewith. A bonding cement, for example one having a neoprene base, is included for adhering the overlapping portions of the bifurcations in bonding contact. In accordance with the teachings above, the material of said joint would be caused to have a substantially greater number of cross-linked polymers therein than in the remainder of the elastomeric material comprising the elastomeric sheet. This combination forms a joint in which the extensibility of the joint is usually no greater than one-fourth of the extensibility of the elastomeric sheet, and in which the likelihood of incremental failure of the joint is reduced.

FIGURES 5 and 6 show the bifurcation in the elastomer which may comprise elastomers 110 and 111 adhered at 112 to provide opposed bifurcations 114 and 115. In FIGURE 6 an integral extruded structure is shown which eliminates the joint 112 in elastomer 116.

FIGURE 7 shows a modified structure in which the elastomer 120 is provided with a molded margin having projecting serrations 121. Plastic panel 122 is molded with bifurcations 123 and 124, the inner walls of which are provided with opposed projecting serrations 125 which are shaped to interlock with serrations. Bifurcations 123, 124 are sufficiently flexible so that they yield enough to admit the marginal edge of elastomer 120 and serrations 121 into interlocking relation with projections 125. Bifurcations 123 and 124 may then be stiffened by thermosetting action.

The bottom of the bifurcation may be recessed as at 126 and the extreme marginal edge of elastomer may be recessed more or less deeply at 127 to provide a series of pockets 128 which may contain a capsule 129 of adhesive which is ruptured by the formation of the joint and spreads to cause elastomer 120 and panel 122 to adhere. Rupture of capsule 129 and the spread of its adhesive contents between serrations 121 and 125 may be assured by pressure rolling the joint after assembly. Recess 126 may be made continuous to assure the proper seating of the marginal edge of elastomer 120 between the bifurcations.

Where the adhesive is a powerful contact adhesive it requires care to insert the marginal edge of the elastomer into the bifurcation completely, particularly when pre-applied. The great flexibility of the bifurcations of elastomer 116 in FIGURE 6 permits bending them freely for assembly purposes.

FIGURE 9 shows how the invention may be applied to roof and wall structures. Here the elastomer 133 may be five, ten or twenty feet wide and length may run in hundreds of feet. These dimensions are given as reasonably representative and are not to be construed as limiting. The real limiting factors are the costs of handling and installation and the cost of supporting or mounting structures. Plastic panels 130 are recessed or bifurcated as at 132 to receive the marginal edge of elastomer 133. Panel 200 which joins two wide elastomer sheets 133 has double bifurcations 132, such as shown in reverse in FIGURE 6. These structures are able to cover large areas, may be used as permanent installations, or may be quickly installed and removed for weather-tight, shock-proof, safe temporary structures. Panels 130 and 200 may be supplied with mounting or fastening means for attaching firmly to supporting structures, to assure mounting security of the entire structure under all conditions. The invention is particularly valuable in all of its aspects in areas subject to seismic shock, whether mild or severe. The several forms are designed, inter alia, to withstand earthquakes of great intensity and duration.

The form of joint shown in FIGURE 10 lends itself to irradiation equally well as those shown in FIGURES 1–6 inclusive because the simplicity of outline assures a smooth surface-to-surface fit at 228. The bifurcations 226 of panel 225 enclose enlarged end 229 of panel 227. The entire joint shown in FIGURE 10 is irradiated including the tapered ends of bifurcations 226 so as to reduce the yield under load within the joint itself. Best results are presently believed to be obtained when the transition from maximum extensibility of elastomer 227 is reduced to a selected minimum value outside the joint, beyond the tapered ends of bifurcations 226. In this way incremental yield between the bifurcations 226 is minimized and step-by-step joint failure prevented.

The radiation source can be radio active isotopes, ordinary material which has been irradiated to produce radio activity. A nuclear reactor or particle accelerator can be used directly, but the above sources would be more economic in most installations. The intensity and duration of irradiation of a joint will depend upon the character of the plastic material, its thickness and the amount of cross linkage desired. Specific properties of a joint may be varied by additives known to the art.

While there have been described above what are presently believed to be the preferred forms of the invention, variations thereof will be obvious to those skilled in the art, and all such changes and variations which fall within the spirit of the invention are intended to be covered by the generic terms in the appended claim, which are variably worded to that end.

I claim:

An all plastic joint for building structures comprising a plastic relatively inextensible panel member, an extensible member of an elastomeric material being highly extensible, the marginal edge of at least one of said members having a bifurcation, a marginal edge of at least part of said other member being positioned in smooth bonding contact with the inner walls of said bifurcation and a bonding cement adhering those portions of said members which are in smooth bonding contact, a second marginal edge of said other member being positioned in smooth bonding contact with an outer wall of said bifurcation and additional bonding cement adhering to those portions of said second marginal edge and said outer wall which are in smooth bonding contact, whereby said plastic joint comprises at least four layers of material securely bonded together, said bonding cement containing a material basically related in chemical structure to the chemical structure of both said members, said portion of said elastomeric material in bonding contact with said panel member having cross-linked polymers herein to such an extent that its extensibility is substantially less than that of the elastomeric material of said extensible member removed from said joint, said relatively inextensible member comprising neoprene and a filler material which renders it relatively inextensible, said elastomeric member being of neoprene and said bonding cement having a neoprene base.

References Cited by the Examiner

UNITED STATES PATENTS

| | | | |
|---|---|---|---|
| Re. 25,733 | 2/1965 | Patry et al. | 50—346 |
| 2,354,485 | 7/1944 | Slaughter | 161—37 |
| 2,388,297 | 11/1945 | Slaughter | 161—38 |
| 2,668,133 | 2/1954 | Brophy et al. | 156—272 |
| 2,997,419 | 8/1961 | Lawton | 156—272 |
| 3,068,132 | 12/1962 | Hall | 156—289 |
| 3,149,017 | 9/1964 | Ehreich et al. | |

ALEXANDER WYMAN, *Primary Examiner.*

DOUGLAS J. DRUMMOND, R. A. FLORES,
*Assistant Examiners.*